US 6,643,053 B2

(12) United States Patent
Li et al.

(10) Patent No.: US 6,643,053 B2
(45) Date of Patent: Nov. 4, 2003

(54) PIECEWISE LINEAR SPATIAL PHASE MODULATOR USING DUAL-MODE MICROMIRROR ARRAYS FOR TEMPORAL AND DIFFRACTIVE FOURIER OPTICS

(75) Inventors: Kebin Li, Concord, CA (US); Jonathan P. Heritage, Davis, CA (US); Kimberly T. Cornett, Davis, CA (US); Olav Solgaard, Stanford, CA (US); Uma Krishnamoorthy, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/079,088

(22) Filed: Feb. 20, 2002

(65) Prior Publication Data

US 2003/0156315 A1 Aug. 21, 2003

(51) Int. Cl.$^7$ ........................ G02B 26/00; G02B 26/08; G02B 5/08
(52) U.S. Cl. ........................ 359/290; 359/291; 359/223; 359/846
(58) Field of Search ................................ 359/290, 291, 359/223, 224, 846, 849, 851, 238

(56) References Cited

U.S. PATENT DOCUMENTS

| | | | | |
|---|---|---|---|---|
| 5,689,361 A | * | 11/1997 | Damen et al. | 359/284 |
| 6,233,086 B1 | * | 5/2001 | Hardiman | 359/290 |
| 2002/0018496 A1 | * | 2/2002 | Gutin | 372/20 |
| 2002/0191235 A1 | * | 12/2002 | O'Connor et al. | 359/9 |
| 2003/0025981 A1 | * | 2/2003 | Ishikawa et al. | 359/290 |

* cited by examiner

Primary Examiner—Jordan M. Schwartz
Assistant Examiner—Timothy Thompson
(74) Attorney, Agent, or Firm—Park, Vaughan & Fleming LLP; Edward J. Grundler

(57) ABSTRACT

One embodiment of the present invention provides a spatial light phase modulator, which can perform piecewise linear phase modulation of a light beam. This spatial light phase modulator includes an array of movable micromirrors and an array of actuators. Each actuator of the array of actuators is movably coupled to one micromirror of the array of movable micromirrors and can move the micromirror both vertically and rotationally. Additionally, the present invention provides an optical function generator that is a femtosecond pulse shaper. This optical function generator includes a diffraction grating that disperses an input pulse into a dispersed spectrum, a lens assembly to focus the dispersed spectrum onto a micromirror array, and the micromirror array to provide spatial filtering to the dispersed spectrum to provide the filtered spectrum.

33 Claims, 9 Drawing Sheets

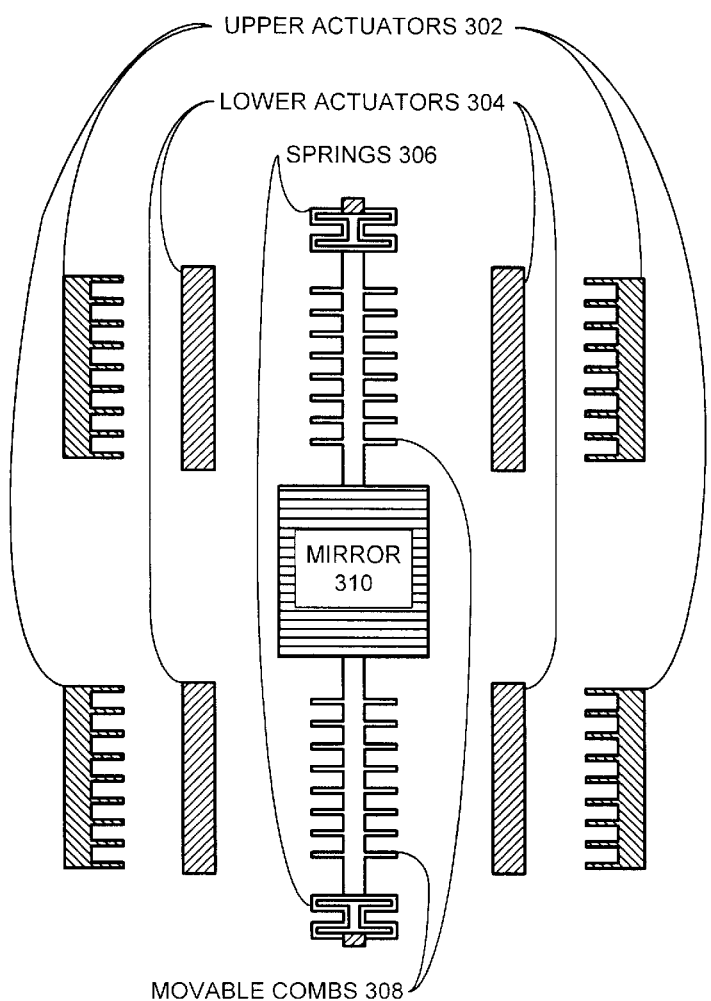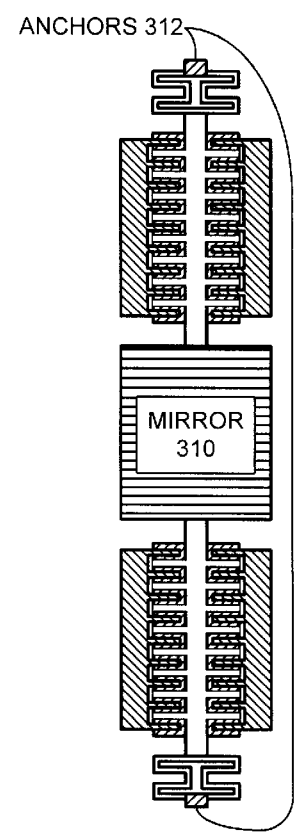
FIG. 3A                    FIG. 3B

PIECEWISE LINEAR SPATIAL PHASE MODULATOR USING DUAL-MODE MICROMIRROR ARRAYS FOR TEMPORAL AND DIFFRACTIVE FOURIER OPTICS

BACKGROUND

1. Field of the Invention

The present invention relates to the fabrication of microscopic electromechanical devices. More specifically, the present invention relates to the fabrication of a phased micromirror array to facilitate programmable shaping of ultra-short optical pulses.

2. Related Art

"Femtosecond pulse shaping" has been developed to generate complicated, ultrafast optical pulses according to user specifications. The key component required to shape a femtosecond pulse is a versatile, high resolution, programmable spatial light phase modulator (SLPM). Recent attention has been focused on developing computer controlled programmable one-dimensional SLPMs for this pulse shaping. Existing linear SLPMs fall into two categories: deformable continuous thin membrane mirrors and pixilated arrays of liquid crystal phase shifters.

Deformation of a continuous membrane produces smooth spectral phase variations and a corresponding high quality optical pulse. Membranes, however, are not capable of producing localized abrupt spectral phase changes. On the other hand, a pixilated array of phase modulators can produce rapid phase changes between pixels. The phase shift for each pixel is constant, however, and the resulting stepwise approximation to smooth phase variations results in undesired energy in the pulse wings.

What is needed is an SLPM that facilitates programmable shaping of ultra-short optical pulses, which does not exhibit the drawbacks described above.

SUMMARY

One embodiment of the present invention provides a spatial light phase modulator, which can perform piecewise linear phase modulation of a light beam. This spatial light phase modulator includes an array of movable micromirrors and an array of actuators. Each actuator of the array of actuators is movably coupled to one micromirror of the array of movable micromirrors and can move the micromirror both vertically and rotationally. These actuators are dual-mode actuators that can expand or contract to cause vertical motion and can tilt to cause rotational motion.

In one embodiment of the present invention, control signals applied to the array of actuators can cause the linear array of movable micromirrors to act in concert to perform piecewise linear phase modulation of the light beam.

In one embodiment of the present invention, vertical forces applied by the actuator can cause the micromirror to have a vertical range of motion of at least pi radians at a specified wavelength.

In one embodiment of the present invention, the actuator includes a thermo-expansion actuator, a piezoelectric actuator, a magnoelectric actuator, or a capacitive actuator.

One embodiment of the present invention provides an optical function generator that is a femtosecond pulse shaper. This optical function generator includes a diffraction grating that disperses an input pulse into a dispersed spectrum, a lens assembly to focus the dispersed spectrum onto a micromirror array, and the micromirror array to provide spatial filtering to the dispersed spectrum to provide a filtered spectrum.

In one embodiment of the present invention, the lens assembly focuses the filtered spectrum on the diffraction grating. This diffraction grating then combines the filtered spectrum into an output pulse.

In one embodiment of the present invention, the optical function generator includes a plurality of actuators movably coupled to the micromirror array. Each actuator of the plurality of actuators can move one mirror of the micromirror array in both elevation and tilt.

One embodiment of the present invention provides a two-dimensional coherent mirror array that includes a two-dimensional micromirror array and a plurality of actuators movably coupled to this two-dimensional micromirror array. Each micromirror of the two-dimensional micromirror array is movably coupled to a triad of actuators positioned such that the micromirror can be elevated and tilted in any direction.

In one embodiment of the present invention, vertical forces applied by the triad of actuators can cause the micromirror to have a vertical range of motion of at least pi radians at a specified wavelength.

In one embodiment of the present invention, an actuator of the plurality of actuators includes a thermo-expansion actuator, a piezoelectric actuator, a magnoelectric actuator, or a capacitive actuator.

One embodiment of the present invention provides a programmable micromirror array, including multiple movable micromirrors. A first movable comb is fixed to one edge of each of the movable micromirrors, and a second movable comb is fixed to the opposite edge of each movable micromirror. These movable combs form a movable portion of an interdigitated actuator coupled to each movable micromirror. This movable portion of the interdigitated actuator can apply vertical and rotational motions to the movable micromirrors.

In one embodiment of the present invention, the programmable micromirror array includes a first folded spring coupled to the distal end of the first movable comb, and a second folded spring coupled to the distal end of the second movable comb. These folded springs provide restoring forces to the movable portion of the interdigitated actuator.

In one embodiment of the present invention, the interdigitated actuator includes a fixed lower actuator and a fixed upper actuator. These fixed actuators act in concert to apply vertical and rotational forces to the movable portion of the interdigitated actuator.

In one embodiment of the present invention, the fixed lower actuator includes planar capacitive drives.

In one embodiment of the present invention, the fixed upper actuator includes vertical comb drives.

In one embodiment of the present invention, the vertical forces applied by the interdigitated actuator can cause the movable micromirror to have a vertical range of motion of at least pi radians at a specified wavelength.

One embodiment of the present invention provides a two-dimensional programmable micromirror array including multiple hexagonally shaped, movable micromirrors. Each micromirror includes a first movable actuator fixed to a first edge of the micromirror, a second movable actuator fixed to a second edge of the micromirror, and a third movable actuator fixed to a third edge of the micromirror. These movable actuators are fixed to alternating edges of the micromirror, and act in concert to apply vertical and two-dimensional rotational motions to the micromirror. Note that each actuator applies vertical motions to one edge of the micromirror, and three actuators acting in concert apply rotational motions to the micromirror.

In one embodiment of the present invention, the movable micromirror includes a first folded spring coupled to the distal end of the first movable actuator, a second folded spring coupled to the distal end of the second movable actuator, and a third folded spring coupled to the distal end of the third movable actuator. These folded springs provides restoring forces to the movable micromirror.

In one embodiment of the present invention, the movable micromirror includes three actuators. Each actuator includes a movable actuator selected from the first movable actuator, the second movable actuator or the third movable actuator. Each actuator also includes a fixed lower actuator and a fixed upper actuator. These fixed lower and upper actuators can apply vertical and rotational forces to the movable micromirror through the movable actuator.

In one embodiment of the present invention, the fixed lower actuator includes planar capacitive drives.

In one embodiment of the present invention, the fixed upper actuator includes vertical comb drives.

In one embodiment of the present invention, vertical forces applied by the interdigitated actuator can cause the micromirror to have a vertical range of motion of at least pi radians at a specified wavelength.

BRIEF DESCRIPTION OF THE FIGURES

FIG. 3A is an exploded view of a movable micromirror assembly in accordance with an embodiment of the present invention.

FIG. 3B is a composite view of a movable micromirror assembly in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Optical Function Generator

Figure 1A:
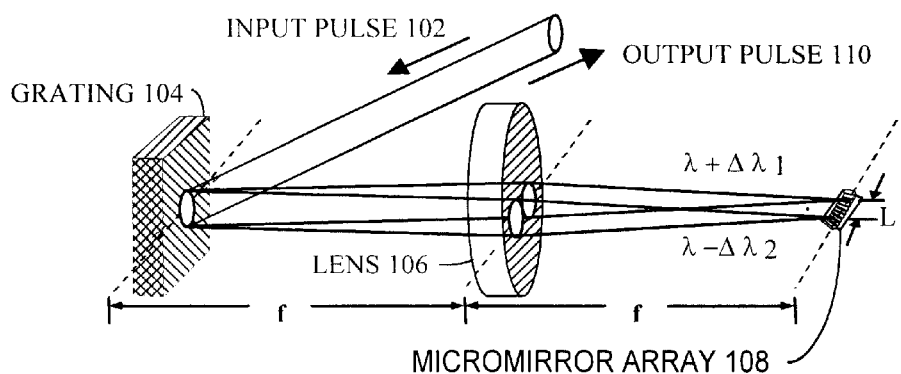
FIG. 1A illustrates an optical function generator in accordance with an embodiment of the present invention.

FIG. 1A illustrates an optical function generator in accordance with an embodiment of the present invention. The optical function generator includes grating 104, lens 106, and micromirror array 108. Grating 104 receives input light pulse 102 and creates spatially dispersed spectrum 112. Lens 106 focuses spatially dispersed spectrum 112 on micromirror array 108.

Micromirror array 108 filters spatially dispersed spectrum 112 and reflects the filtered spectrum toward lens 106. Lens 106 focuses the filtered spectrum on grating 104, which combines the filtered spectrum into output pulse 110.

Figure 1B:
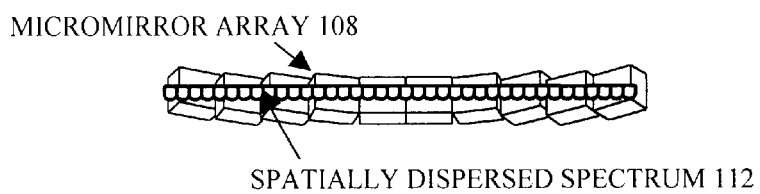
FIG. 1B illustrates micromirror array 108 in accordance with an embodiment of the present invention.

FIG. 1B illustrates micromirror array 108 in accordance with an embodiment of the present invention. Actuators associated with each micromirror of micromirror array 108 adjust the elevation and tilt of each micromirror within micromirror array 108 to filter spatially dispersed spectrum 112. The elevation of each micromirror can be adjusted through a range of at least pi radians at a specified wavelength.

Creating an Actuator

Figure 2A:
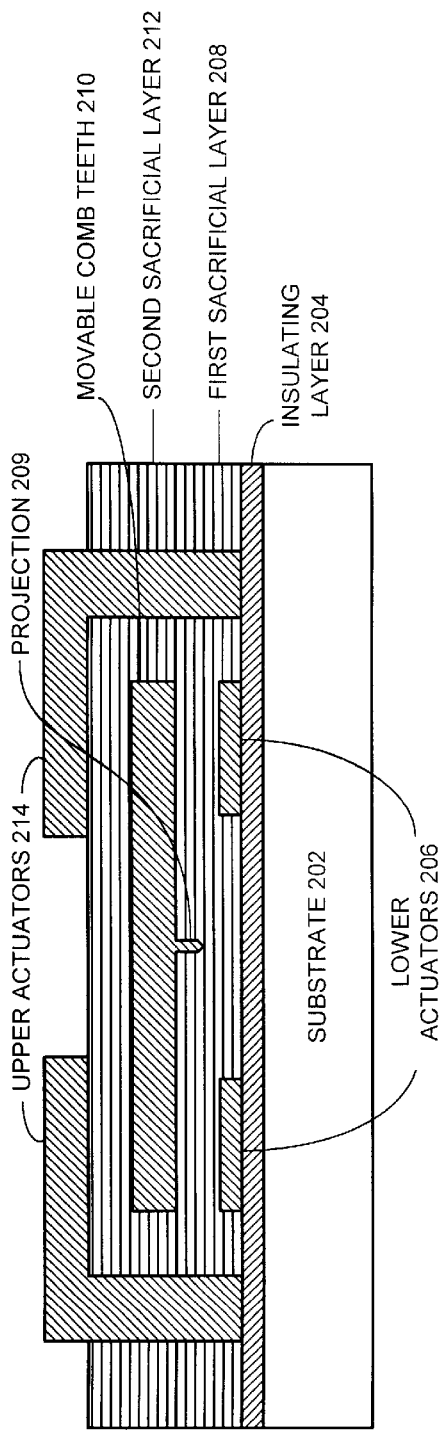
FIG. 2A illustrates construction of a movable actuator in accordance with an embodiment of the present invention.

FIG. 2A illustrates construction of a movable actuator in accordance with an embodiment of the present invention. The movable actuator and micromirror are constructed on substrate 202. Substrate 202 can be any suitable material such as silicon. Next, insulating layer 204 is applied to substrate 202. Insulating layer 204 can be any suitable material such as silicon nitride.

Lower actuators 206 are then deposited on insulating layer 204. Lower actuators 206 can be any suitable material such as polysilicon. Note that the steps involved in depositing insulating layer 204 include applying a masking pattern on insulating layer 204 and then etching the pattern so that lower actuators 206 are deposited in the correct location. These steps related to masking are well known in the art and will not be described further herein. Several other layers involved in this process also require the application, etching, and removal of masking layers.

After depositing lower actuators 206, first sacrificial layer 208 is applied over lower actuators 206 and over the exposed portions of insulating layer 204. First sacrificial layer 208 can be any suitable material such as silicon oxide. Projection 209 is then formed to provide a device to prevents movable comb teeth 210 from contacting and sticking to the surface of lower actuators 206. Next, the mirror assembly including movable comb teeth 210 is deposited on first sacrificial layer 208. This mirror assembly is described in more detail in conjunction with FIGS. 3A and 3B below. Movable comb teeth 210 and the associated mirror assembly can be any suitable material such as polysilicon.

Next, second sacrificial layer 212 is applied over movable comb teeth 210 and the mirror assembly. Second sacrificial layer 212 can be any suitable material such as silicon oxide. Vias are then created through sacrificial layers 208 and 212 down to insulating layer 204. Upper actuators 214 are then deposited in the vias and across the surface of second sacrificial layer 212. Upper actuators 214 can be any suitable material such as polysilicon.

Figure 2B:
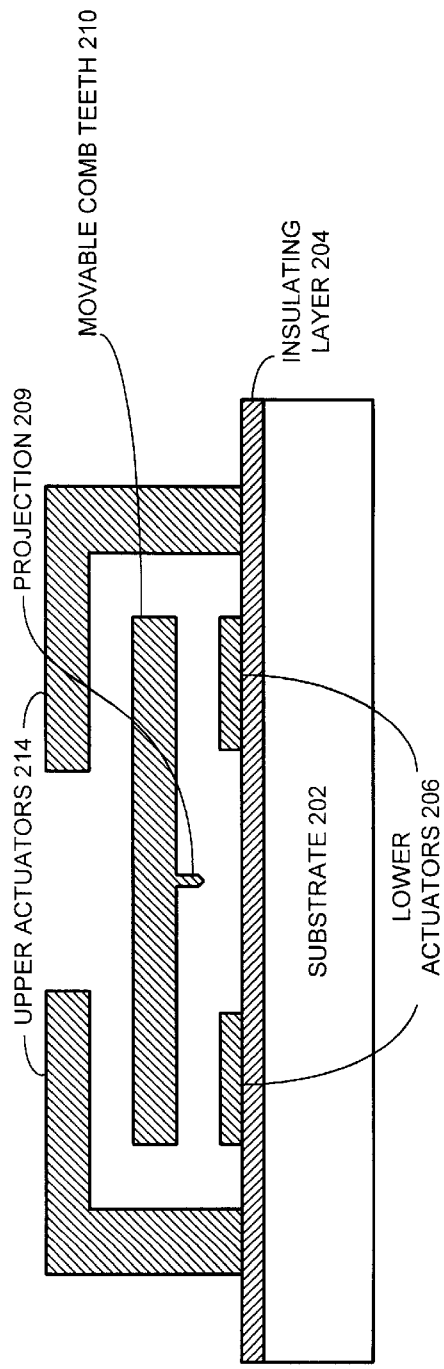
FIG. 2B illustrates a cross-sectional view of a movable actuator in accordance with an embodiment of the present invention.

FIG. 2B illustrates a cross-section view of a movable actuator in accordance with an embodiment of the present invention. After depositing upper actuators 214, sacrificial layers 208 and 212 are selectively etched away to leave the structure illustrated in FIG. 2B. A reflective material such as gold can be deposited on the mirror area of the mirror assembly.

Micromirror Assembly

FIG. 3A is an exploded view of a movable micromirror assembly in accordance with an embodiment of the present invention. Upper actuators 302 and lower actuators 304 operate in conjunction with movable combs 308 to apply vertical and rotational forces to movable combs 308 and, in turn, to movable mirror 310. Springs 306 provide support and restoring forces to movable combs 308. Anchors 312 fix the opposite ends of springs 306 to substrate 202.

FIG. 3B is an unexploded view of a movable micromirror assembly in accordance with an embodiment of the present invention. Note that movable combs 308 and upper actuators 302 form an interdigitated actuator for movable mirror 310.

Micromirror Array

Figure 4:
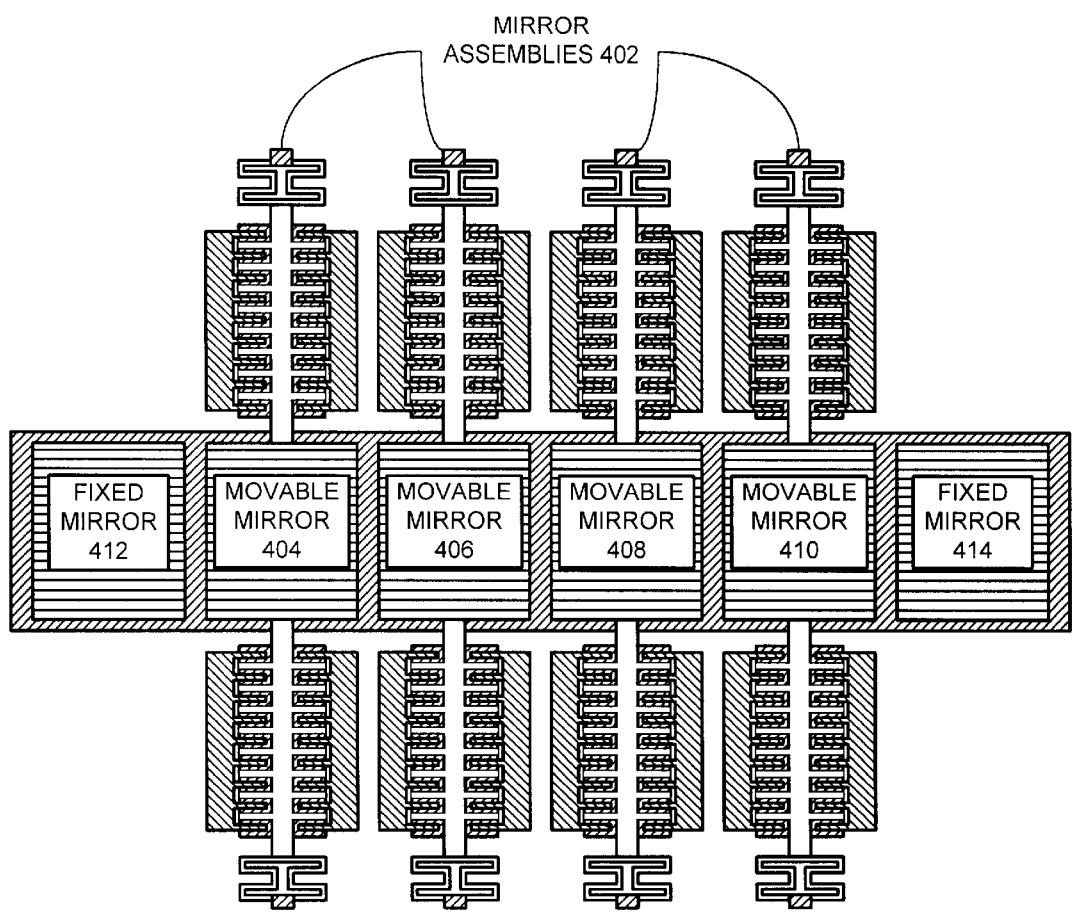
FIG. 4 illustrates a programmable micromirror array in accordance with an embodiment of the present invention.

FIG. 4 illustrates a programmable micromirror array in accordance with an embodiment of the present invention. The programmable micromirror array includes micromirror assemblies 402. Micromirror assemblies 402 are described above in conjunction with FIGS. 3 and 4. Note that there can be more or less micromirror assemblies than the number shown in FIG. 4.

Micromirror assemblies 402 include movable mirrors 404, 406, 408, and 410. Movable mirrors 404, 406, 408, and 410 can be individually moved in a vertical direction and can be individually rotated as described below in conjunction with FIGS. 5A through 5E. Movable mirrors 404, 406, 408, and 410 can be controlled, possibly by a computer, to allow femtosecond pulse shaping to generate complicated, ultrafast optical pulses according to user specifications. Fixed mirrors 412 and 414 are available for a fixed reference if necessary.

Controlling the Mirrors

Figure 5A:
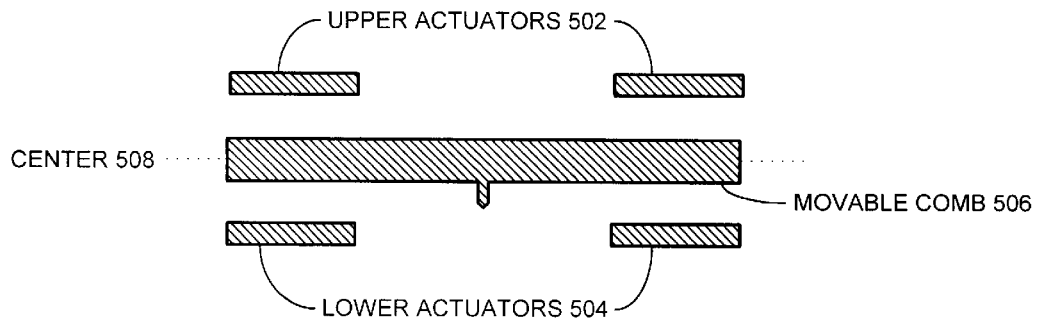
FIG. 5A illustrates a movable comb in a rest position in accordance with an embodiment of the present invention.

FIG. 5A illustrates a movable comb in a rest position in accordance with an embodiment of the present invention. Springs 306 provide a restoring force to movable comb 506 so that movable comb 506 is at center 508 between upper actuators 502 and lower actuators 504.

Figure 5B:
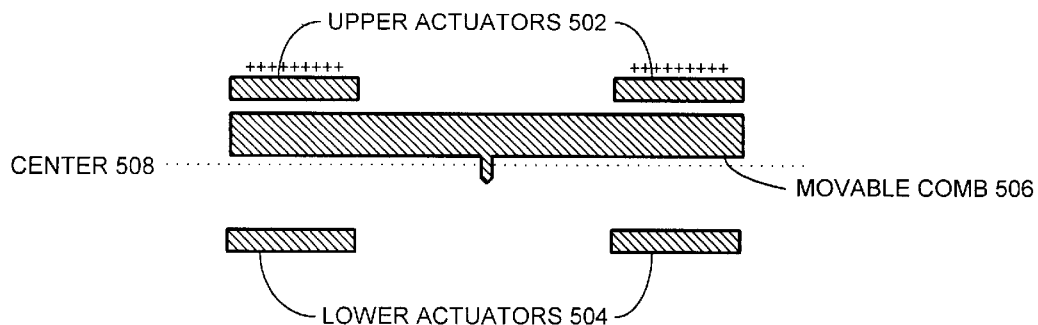
FIG. 5B illustrates a movable comb in a raised position in accordance with an embodiment of the present invention.

FIG. 5B illustrates a movable comb in a raised position in accordance with an embodiment of the present invention. A positive electrical charge is placed on upper actuators 502 causing movable comb 506 to rise above center 508.

Figure 5C:
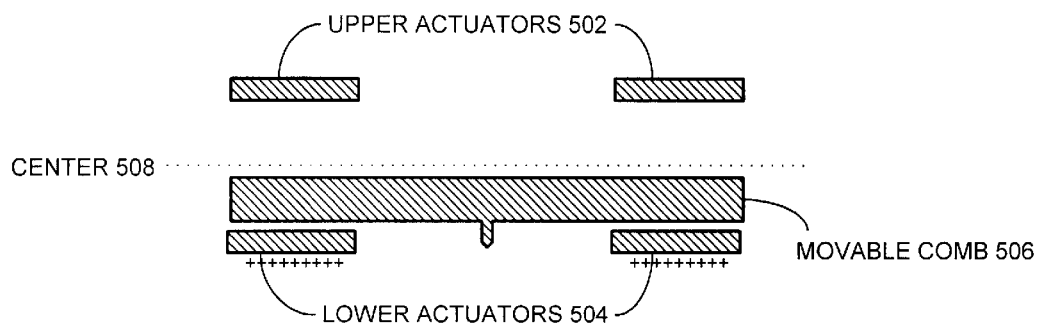
FIG. 5C illustrates a movable comb in a lowered position in accordance with an embodiment of the present invention.

FIG. 5C illustrates a movable comb in a lowered position in accordance with an embodiment of the present invention. A positive electrical charge is placed on lower actuators 504 causing movable comb 506 to move below center 508. Note that the full vertical range of motion of movable comb 506 is at least pi radians at a specified frequency. This range of motion allows precise adjustment of the phase of an optical pulse.

Figure 5D:
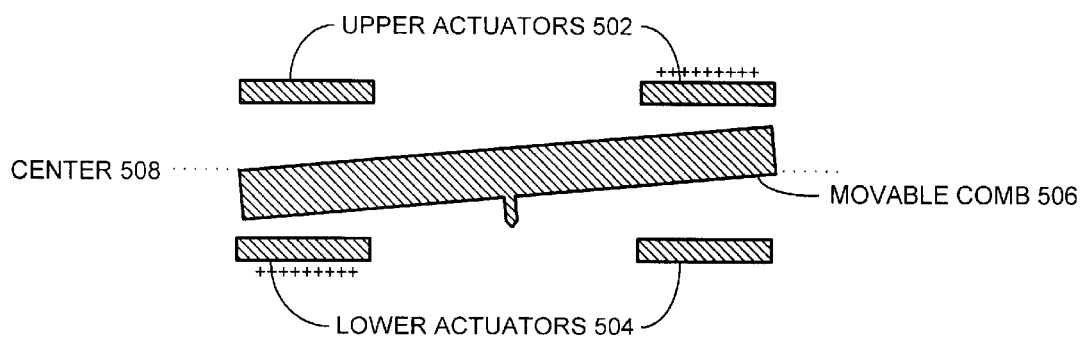
FIG. 5D illustrates a movable comb rotated in a counter-clockwise position in accordance with an embodiment of the present invention.

FIG. 5D illustrates a movable comb rotated in a counter-clockwise position in accordance with an embodiment of the present invention. A positive electrical charge is placed on left lower actuator 504 and right upper actuator 502 causing movable comb 506 to rotate counter-clockwise.

Figure 5E:
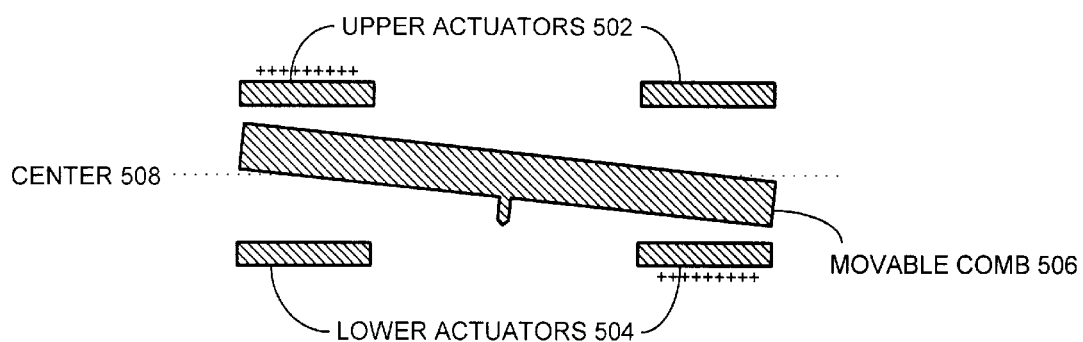
FIG. 5E illustrates a movable comb rotated in a clockwise position in accordance with an embodiment of the present invention.

FIG. 5E illustrates a movable comb rotated in a clockwise position in accordance with an embodiment of the present invention. A positive electrical charge is placed on left upper actuator 502 and right lower actuator 504 causing movable comb 506 to rotate clockwise.

Two-Dimensional Micromirror Assembly

Figure 6:
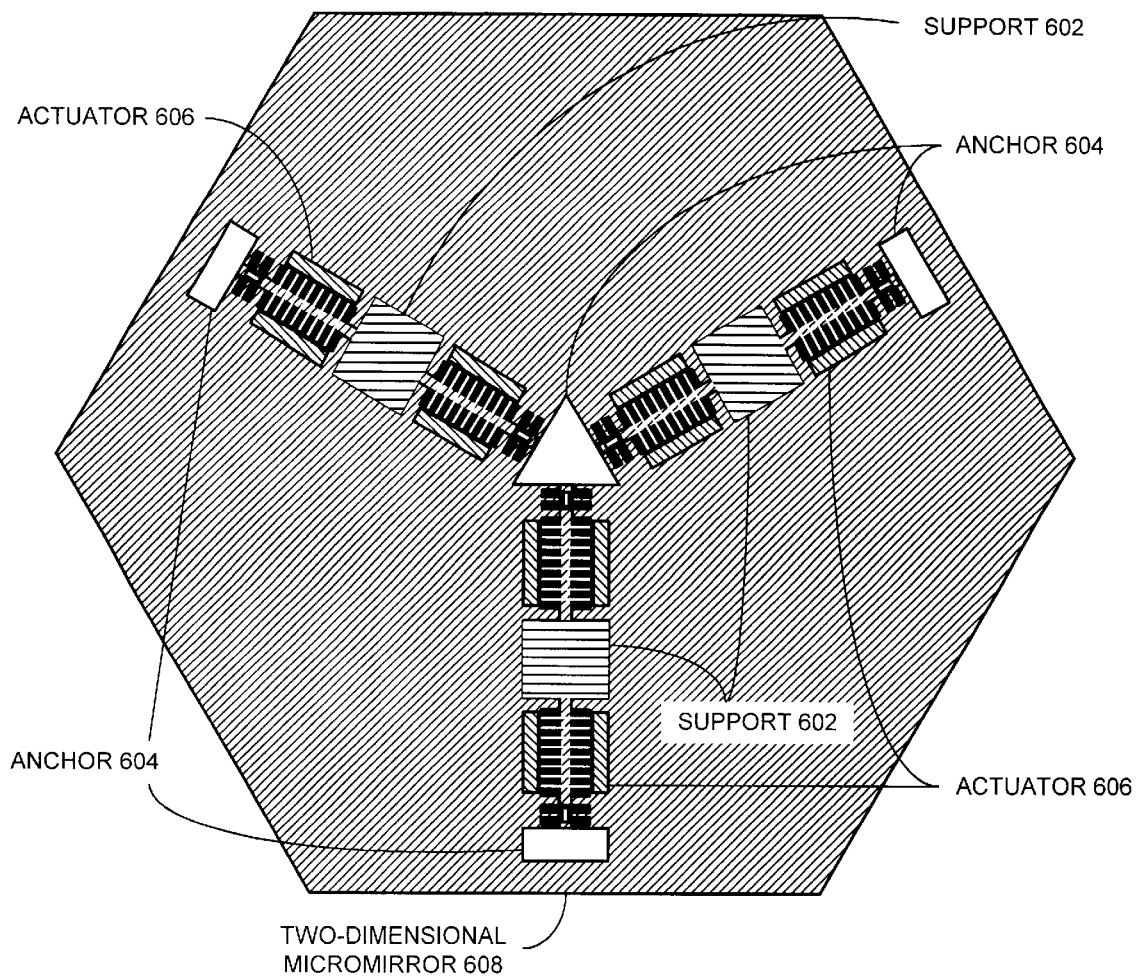
FIG. 6 illustrates a two-dimensional micromirror assembly in accordance with an embodiment of the present invention.

FIG. 6 illustrates a two-dimensional micromirror assembly in accordance with an embodiment of the present invention. Two-dimensional micromirror 608 includes three actuators 606. Actuators 606 can be the actuators described in detail in conjunction with FIGS. 3A and 3B above or may be any suitable actuator which will impart vertical motion to two-dimensional micromirror array 608. Springs 306 on actuators 606 are fixed to anchors 604. Anchors 604 are fixed to insulating layer 204, while supports 602 are fixed to a hexagonal mirror surface. Actuators 606 work in concert to apply vertical and two-dimensional rotational motions to the hexagonal mirror surface. Note that the vertical motion is at least pi radians at a specified frequency. Note also that each actuator individually supplies only vertical motion to two-dimensional micromirror array 608 and, in concert, apply two-dimensional rotational motions to two-dimensional micromirror array 608.

Array of Two-Dimensional Micromirror Assemblies

Figure 7:
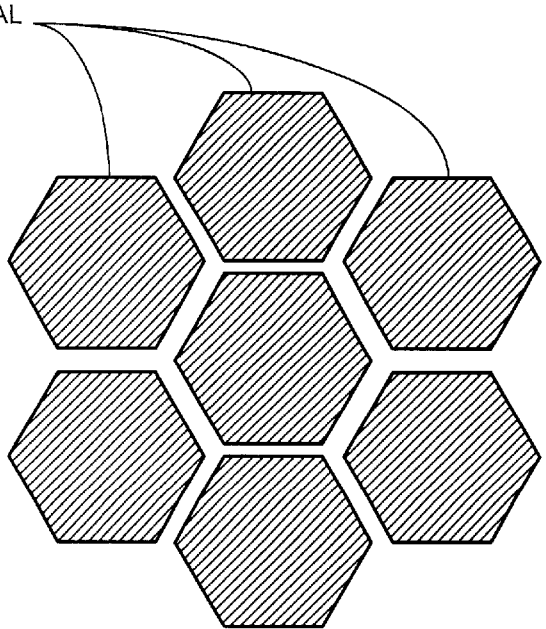
FIG. 7 illustrates an array of two-dimensional micromirror assemblies in accordance with an embodiment of the present invention.

FIG. 7 illustrates an array of two-dimensional micromirror assemblies in accordance with an embodiment of the present invention. This array includes multiple two-dimensional micromirrors 608. Two-dimensional micromirror 608 includes a hexagonal shape to allow efficient packing of the array. Note that the array can include more two-dimensional micromirrors 608 than shown in FIG. 7. This array can be controlled, possibly by a computer, to provide a digital diffractive optic device according to user specifications.

Creating Micromirror Assemblies

Figure 8:
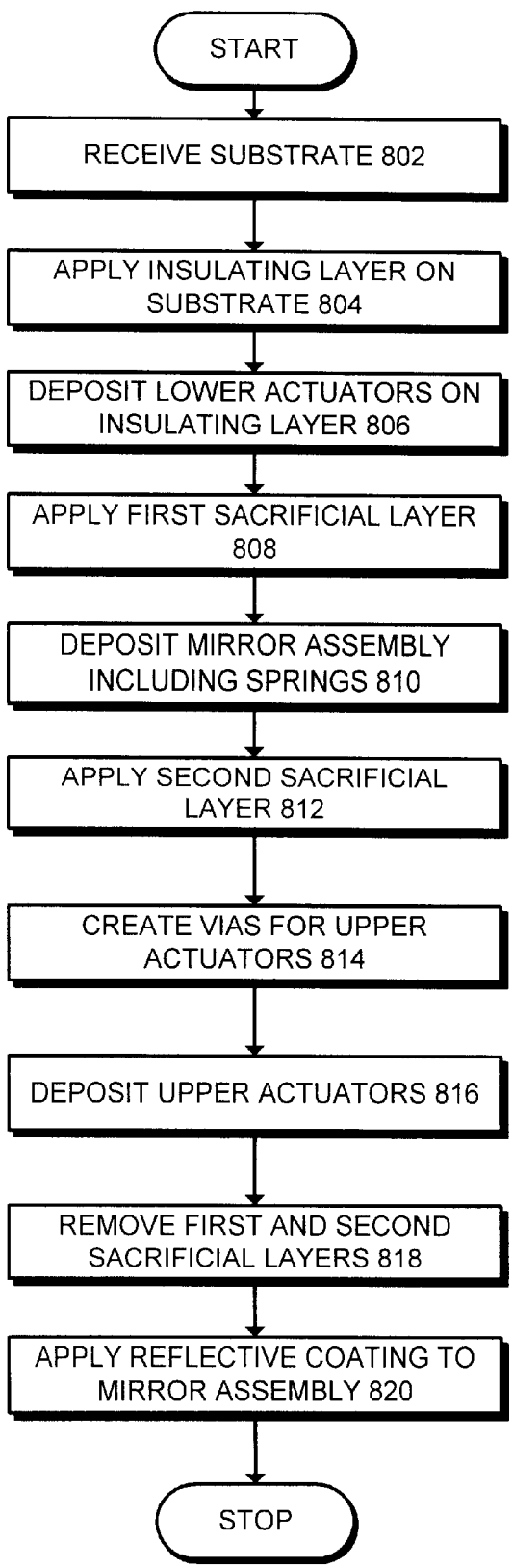
FIG. 8 is a flowchart illustrating the process of creating a programmable micromirror array in accordance with an embodiment of the present invention.

FIG. 8 is a flowchart illustrating the process of creating a programmable micromirror array in accordance with an embodiment of the present invention. The process starts when the system receives substrate 202 (step 802). Next, the system applies insulating layer 204 on the substrate (step 804). After applying insulating layer 204, the system deposits lower actuators 206 on insulating layer 204 (step 806).

Next, the system applies first sacrificial layer 208 over lower actuators 206 and the exposed portions of insulating layer 204 (step 808). The system then deposits the mirror assembly, including movable comb teeth 210, on the first sacrificial layer (step 810). Second sacrificial layer 212 is then applied over the mirror assembly and the exposed portions of first sacrificial layer 208 (step 812).

The system next creates vias through the sacrificial layers for upper actuators 214 (step 814). Next, upper actuators 214 are deposited within these vias and across portions of second sacrificial layer 212 (step 816). After depositing upper actuators 214, sacrificial layers 208 and 212 are removed by selective etching (step 818). Finally, a reflective coating is applied to the mirror assemblies (step 820).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A spatial light phase modulator, wherein the spatial light phase modulator can perform piecewise linear phase modulation of a light beam, comprising:
    a linear array of movable micromirrors; and
    an array of actuators, wherein an actuator of the array of actuators is movably coupled to a micromirror of the linear array of movable micromirrors, and wherein the actuator can move the micromirror both vertically and rotationally,
    wherein the actuator includes:
        a first movable comb fixedly coupled to a first edge of a micromirror within the linear array of movable micromirrors, and
        a second movable comb fixedly coupled to a second edge opposite of the first edge of the micromirror, wherein the first movable comb and the second movable comb form a movable portion of an interdigitated actuator.

2. The spatial light phase modulator of claim 1, wherein control signals applied to the array of actuators can cause the linear array of movable micromirrors to act in concert to perform piecewise linear phase modulation of the light beam.

3. The spatial light phase modulator of claim 1, wherein vertical forces applied by the actuator can cause the micromirror to have a vertical range of motion of a distance equal to at least pi radians of wavelength at a specified wavelength.

4. The spatial light phase modulator of claim 1, wherein the actuator includes one of:
    a thermo-expansion actuator;
    a piezoelectric actuator;
    a magnoelectric actuator; and
    a capacitive actuator.

5. An optical function generator, wherein the optical function generator is a femtosecond pulse shaper, comprising:
    a diffraction grating, wherein the diffraction grating disperses an input pulse into a dispersed spectrum;
    a lens assembly;
    a micromirror array; and
    a plurality of actuators movably coupled to the micromirror array, wherein an actuator of the plurality of actuators can move a mirror of the micromirror array in both elevation and tilt;
    wherein the actuator includes:
        a first movable comb fixedly coupled to a first edge of a micromirror within the linear array of movable micromirrors, and
        a second movable comb fixedly coupled to a second edge opposite of the first edge of the micromirror, wherein the first movable comb and the second movable comb form a movable portion of an interdigitated actuator; and
    wherein the lens assembly focuses the dispersed spectrum onto the micromirror array, and wherein the micromirror array provides spatial filtering to the dispersed spectrum to provide a filtered spectrum.

6. The optical function generator of claim 5;
    wherein the lens assembly focuses the filtered spectrum on the diffraction grating; and
    wherein the diffraction grating combines the filtered spectrum into an output pulse.

7. The optical function generator of claim 5, wherein the actuator includes one of:
    a thermo-expansion actuator;
    a piezoelectric actuator;
    a magnoelectric actuator; and
    a capacitive actuator.

8. A two-dimensional coherent mirror array, comprising:
    a two-dimensional micromirror array; and
    a plurality of actuators movably coupled to the two-dimensional micromirror array, wherein a micromirror of the two-dimensional micromirror array is movably coupled to a triad of actuators of the plurality of actuators, and wherein the triad of actuators are positioned such that the micromirror can be elevated and tilted in any direction; and
    wherein an actuator of the plurality of actuators includes:
        a first movable comb fixedly coupled to a first edge of a micromirror within the linear array of movable micromirrors, and
        a second movable comb fixedly coupled to a second edge opposite of the first edge of the micromirror, wherein the first movable comb and the second movable comb form a movable portion of an interdigitated actuator.

9. The two-dimensional coherent mirror array of claim 8, wherein vertical forces applied by the triad of actuators can cause the micromirror to have a vertical range of motion of a distance equal to at least pi radians of wavelength at a specified wavelength.

10. The two-dimensional coherent mirror array of claim 8, wherein an actuator of the plurality of actuators includes one of:
    a thermo-expansion actuator;
    a piezoelectric actuator;
    a magnoelectric actuator; and
    a capacitive actuator.

11. A programmable micromirror array, comprising:
    an at least one movable micromirror;
    a first movable comb fixedly coupled to a first edge of a movable micromirror within the at least one movable micromirror; and
    a second movable comb fixedly coupled to a second edge opposite of the first edge of the movable micromirror;

wherein the first movable comb and the second movable comb form a movable portion of an interdigitated actuator; and wherein the movable portion of the interdigitated actuator can apply vertical and rotational motions to the movable micromirror.

12. The programmable micromirror array of claim 11, further comprising:

a first folded spring coupled to the distal end of the first movable comb, wherein the first folded spring provides restoring forces to the first movable comb; and a second folded spring coupled to the distal end of the second movable comb, wherein the second folded spring provides restoring forces to the second movable comb.

13. The programmable micromirror array of claim 11, wherein the interdigitated actuator further comprises:

a fixed lower actuator; and a fixed upper actuator;

wherein the fixed lower actuator and the fixed upper actuator can apply vertical and rotational forces to the movable portion of the interdigitated actuator.

14. The programmable micromirror array of claim 13, wherein the fixed lower actuator includes planar capacitive drives.

15. The programmable micromirror array of claim 13, wherein the fixed upper actuator includes vertical comb drives.

16. The programmable micromirror array of claim 13, wherein vertical forces applied by the interdigitated actuator can cause the movable micromirror to have a vertical range of motion of at least pi radians at a specified wavelength.

17. A two-dimensional programmable micromirror array, comprising:

a plurality of movable micromirrors, wherein a micromirror of the plurality of movable micromirrors includes a hexagonal shape;

a first movable actuator fixedly coupled to a first edge of the micromirror;

a first folded spring coupled to the distal end of the first movable actuator wherein the first folded spring provides restoring forces to the first movable actuator;

a second movable actuator fixedly coupled to a second edge of the micromirror;

a second folded spring coupled to the distal end of the second movable actuator, wherein the second folded spring provides restoring forces to the second movable actuator;

a third movable actuator fixedly coupled to a third edge of the micromirror; and a third folded spring coupled to the distal end of the third movable actuator, wherein the third folded spring provides restoring forces to the third movable actuator wherein the first movable actuator, the second movable actuator, and the third movable actuator are fixedly coupled to alternating edges of the micromirror, and wherein the first movable actuator, the second movable actuator, and the third movable actuator act in concert to apply vertical and two-dimensional rotational motions to the micromirror.

18. The two-dimensional programmable micromirror array of claim 17, further comprising three interdigitated actuators, wherein an interdigitated actuator includes:

a movable actuator, wherein the movable actuator includes one of the first movable actuator, the second movable actuator and the third movable actuator;

a fixed lower actuator; and a fixed upper actuator;

wherein the fixed lower actuator and the fixed upper actuator can apply vertical and rotational forces to the movable actuator.

19. The two-dimensional programmable micromirror array of claim 18, wherein the fixed lower actuator includes planar capacitive drives.

20. The two-dimensional programmable micromirror array of claim 18, wherein the fixed upper actuator includes vertical comb drives.

21. The two-dimensional programmable micromirror array of claim 18, wherein vertical forces applied by the movable actuator can cause the micromirror to have a vertical range of motion of at least pi radians at a specified wavelength.

22. A method for creating a programmable micromirror, comprising:

receiving a substrate;

applying an insulating layer on the substrate;

depositing a plurality of lower actuators on the insulating layer;

applying a first sacrificial layer over the plurality of lower actuators and exposed portions of the insulating layer;

depositing a mirror assembly on the first sacrificial layer;

applying a second sacrificial layer over the mirror assembly and exposed portions of the first sacrificial layer;

creating a plurality of voids through the first sacrificial layer and the second sacrificial layer, wherein the insulating layer is exposed through the plurality of voids;

depositing a plurality of upper actuators on exposed portions of the insulating layer; and removing the first sacrificial layer and the second sacrificial layer.

23. The method of claim 22, wherein the mirror assembly comprises:

a surface for the programmable micromirror;

a first movable comb; and a second movable comb;

wherein the first movable comb and the second movable comb are fixedly coupled to opposite edges of the surface.

24. The method of claim 23, wherein the first movable comb and the second movable comb form a movable portion of an interdigitated actuator; and wherein the interdigitated actuator can apply vertical and rotational motions to the mirror assembly.

25. The method of claim 24, wherein vertical forces applied by the interdigitated actuator can cause the programmable micromirror to have a vertical range of motion of at least pi radians at a specified wavelength.

26. The method of claim 23, further comprising:

creating a first folded spring at the distal end of the first movable comb; and creating a second folded spring at the distal end of the second movable comb;

wherein the first folded spring and the second folded spring create restoring forces to the mirror assembly.

27. The method of claim 23, further comprising applying a reflective coating to the surface, wherein the reflective coating forms a mirror.

28. The method of claim 23, wherein the mirror assembly includes a projection on a lower surface projecting toward the plurality of lower actuators; and wherein the projection prevents the mirror assembly from contacting the plurality of lower actuators.

29. The method of claim 22, wherein the mirror assembly comprises:

a hexagonal surface for the programmable micromirror;

a first movable comb;

a second movable comb; and a third movable comb;

wherein the first movable comb, the second movable comb, and the third movable comb are fixedly coupled to alternating edges of the hexagonal surface.

30. The method of claim 29, wherein the first movable comb, the second movable comb, and the third movable comb form a movable portion of an interdigitated actuator; and wherein the interdigitated actuator can apply vertical and two-dimensional rotational motions to the mirror assembly.

31. The method of claim 30, wherein vertical forces applied by the interdigitated actuator can cause the mirror assembly to have a vertical range of motion of at least pi radians at a specified wavelength.

32. The method of claim 29, further comprising:

creating a first folded spring at the distal end of the first movable comb;

creating a second folded spring at the distal end of the second movable comb; and creating a third folded spring at the distal end of the third movable comb;

wherein the first folded spring, the second folded spring, and the third folded spring create restoring forces to the mirror assembly.

33. The method of claim 29, further comprising applying a reflective coating to the hexagonal surface, where the reflective coating forms a mirror.

* * * * *